US009639486B2

(12) United States Patent
Imada et al.

(10) Patent No.: US 9,639,486 B2
(45) Date of Patent: *May 2, 2017

(54) METHOD OF CONTROLLING VIRTUALIZATION SOFTWARE ON A MULTICORE PROCESSOR

(71) Applicant: Hitachi, Ltd., Tokyo (JP)

(72) Inventors: Takayuki Imada, Tokyo (JP); Toshiomi Moriki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 14/528,529

(22) Filed: Oct. 30, 2014

(65) Prior Publication Data

US 2015/0120979 A1    Apr. 30, 2015

(30) Foreign Application Priority Data

Oct. 31, 2013 (JP) ................. 2013-226827

(51) Int. Cl.
  *G06F 13/24* (2006.01)
  *G06F 9/44* (2006.01)
  *G06F 9/455* (2006.01)

(52) U.S. Cl.
  CPC ............ *G06F 13/24* (2013.01); *G06F 9/4406* (2013.01); *G06F 9/45558* (2013.01); *G06F 2009/45575* (2013.01); *Y02B 60/1228* (2013.01)

(58) Field of Classification Search
  CPC .... G06F 13/24; G06F 9/45558; G06F 9/4406; G06F 2009/45575; Y02B 60/1228
  See application file for complete search history.

(56) References Cited

U.S. PATENT DOCUMENTS 7,685,635 B2 *  3/2010  Vega ................. G06F 9/4843
                                                       718/1
7,900,204 B2 *  3/2011  Bennett ............ G06F 9/45558
                                                       712/244

(Continued)

FOREIGN PATENT DOCUMENTS

JP        06-325008 A       11/1994
JP       2010-108271 A       5/2010

OTHER PUBLICATIONS

"Intel Virtualization Technology" by Uhlig et al. IEEE 0018-9162/05, 2005.*

(Continued)

*Primary Examiner* — Jing-Yih Shyu
(74) *Attorney, Agent, or Firm* — Volpe and Koenig, P.C.

(57) ABSTRACT

A computer, having: a first OS to which a first processor core group is allocated; and a virtualization module to which a second processor core group is allocated, wherein a virtualization module registers interrupt handler processing for resetting the second processor core group, wherein a first OS has: a monitoring module for monitoring the virtualization module; and an interrupt control module for obtaining identifiers of the second processor core group at a time of booting of the virtualization module, and, when the monitoring module determines to reboot the virtualization module, issuing resetting interrupt to the processor cores of the second processor core group that are associated with the kept identifiers, wherein the second processor core group receives the resetting interrupt and executes the interrupt handler processing to reset its own processor cores, wherein the interrupt control module issues startup interrupt to the second processor core group.

15 Claims, 4 Drawing Sheets

(56) References Cited

U.S. PATENT DOCUMENTS

| | | | |
|---|---|---|---|
| 8,429,669 B2 * | 4/2013 | Moriki | G06F 9/463 |
| | | | 718/1 |
| 2008/0066143 A1 * | 3/2008 | Charles Tai | G06F 8/61 |
| | | | 726/1 |
| 2008/0155092 A1 * | 6/2008 | Kumar | G06F 11/348 |
| | | | 709/224 |
| 2010/0115513 A1 | 5/2010 | Moriki et al. | |
| 2015/0067229 A1 * | 3/2015 | Connor | G06F 13/4022 |
| | | | 710/317 |

OTHER PUBLICATIONS

Intel Corporation, "Intel 64 and IA-32 Architectures Software Developer's Manual Volume 3C: System Programming Guide, Part 3", Jun. 2014.

* cited by examiner

METHOD OF CONTROLLING VIRTUALIZATION SOFTWARE ON A MULTICORE PROCESSOR

CLAIM OF PRIORITY

The present application claims priority from Japanese patent application JP 2013-226827 filed on Oct. 31, 2013, the content of which is hereby incorporated by reference into this application.

BACKGROUND

This invention relates to a control technology for cases where virtualization software is used on a computer that has a multicore processor.

In recent years, for a storage apparatus used in a company, importance is put on not only access performance of each storage apparatus but also cost performance such as low price, energy savings, and space savings. Up to now, an individual dedicated storage apparatus is provided depending on a kind of access interface (I/F) or a protocol. However, in recent years, a unified storage apparatus including access I/Fs of both a storage area network (SAN) and a local area network (LAN) has been emerging, and high cost performance thereof has been attracting attention.

In the unified storage apparatus, it is necessary to simultaneously operate both a block server operating system (OS) for processing a block access (HDD access method on a sector basis) from a Storage Area Network Interface (SAN I/F) within the same casing and a file server OS for processing a file access (data access method on a file basis) from a Local Area Network Interface (LAN I/F). For example, virtualization software such as a virtual machine monitor (VMM) is known as means for realizing simultaneous operations of a plurality of OSes on a single computer.

The virtualization software is a technology that has been used mainly for a server apparatus, and generates a plurality of logical partitions on a single computer. Individual OSes can be independently executed in the respective logical partitions, and hence the simultaneous operations thereof can be realized by generating two logical partitions within the unified storage apparatus, operating the block server OS in one logical partition and the file server OS as a guest OS in the other logical partition, and coupling the two through a virtual communication channel.

A main role of the virtualization software is to manage correspondences between physical resources (processor, memory, and I/O device) of the computer and the logical partition. In order to manage the physical resources, the virtualization software constantly monitors a usage situation of the processor in the logical partition, a communication situation involving an interrupt, and the like, and, when access is made to resources more than the resources allocated to the guest OS in the logical partition, suppresses the access or substitutes processing.

Considerable deterioration in performance (overhead) occurs when the entire processing is performed by software, and hence x86-series processors in recent years have a function dedicated to hardware support of the management of the physical resources performed by the virtualization software (see, for example, JP 2010-108271 A). In the following description, the function of this kind is referred to as "hardware-assisted virtualization".

In the case where virtualization software is used, every processor core in a socket is run with virtualization enabled. Similarly, in the case where virtualization software is not used, every processor core in a socket is run with virtualization disabled. The premise of virtualization in a multicore processor computer is that a single VMM or a single OS runs directly on a multicore processor and, when the multicore processor needs to be reset, every processor core in a socket of the multicore processor is reset (see, for example, JP 6-325008 A).

SUMMARY

To execute virtualization software for running the file server OS (a second OS) and the block server OS (a first OS) independently of the virtualization software on a multicore processor, a processor core is allocated to the virtualization software and to the first OS.

A problem with the related art described above is that a failure in the virtualization software for running the file server OS (the second OS) causes all processor cores in the multicore processor to reset, thereby unnecessarily resetting the processor core of the block server OS (the first OS), which runs independently of the virtualization software, as well.

This invention has been made in view of the problem described above, and an object of this invention is therefore to reset only a processor core that executes virtualization software for running a second OS when the processor core is to be reset due to a failure in the virtualization software, without resetting a processor core of a first OS.

A representative aspect of the present disclosure is as follows. A method of controlling a computer, the computer comprising: a multicore processor having a function of hardware-assisted virtualization; a memory; a first processor core group of processor cores of the multicore processor where the hardware-assisted virtualization is disabled; a second processor core group of processor cores of the multicore processor where the hardware-assisted virtualization is enabled; a first memory group comprising a partial area of the memory; and a second memory group comprising a remaining area of the memory, the method comprising: a first step of allocating the first processor core group and the first memory group to a first OS, and booting the first OS; a second step of allocating the second processor core group and the second memory group to a virtualization module, which runs a virtual machine, and booting the virtualization module; a third step of allocating, by the virtualization module, a given area of the memory and given processor cores of the second processor core group to the virtual machine, and booting a second OS; a fourth step of registering, by the virtualization module, interrupt handlers for resetting the second processor core group; a fifth step of obtaining and keeping, by the first OS, identifiers of the processor cores that belong to the second processor core group when the virtualization module is booted; a sixth step of monitoring, by the first OS, an operation state of the virtualization module and determining whether or not the virtualization module is to be rebooted, based on given conditions; a seventh step of issuing, by the first OS, when the virtualization module is to be rebooted, resetting interrupt to the processor cores belonging to the second processor core group that are associated with the kept identifiers; an eighth step of receiving, by the second processor core group that is allocated to the virtualization module, the resetting interrupt and executing the interrupt handlers to reset the processor cores of the second processor core group; and a ninth step of issuing, by the first OS, startup interrupt to the second processor core group.

This invention can thus reset only a processor core that executes a virtualization module for running the second OS in a multicore processor when the processor core is to be reset due to a failure in the virtualization module, without resetting a processor core that executes the first OS.

DETAILED DESCRIPTION OF THE PREFERRED EMBODIMENT

An embodiment of this invention is described below with reference to the accompanying drawings.

Figure 1:
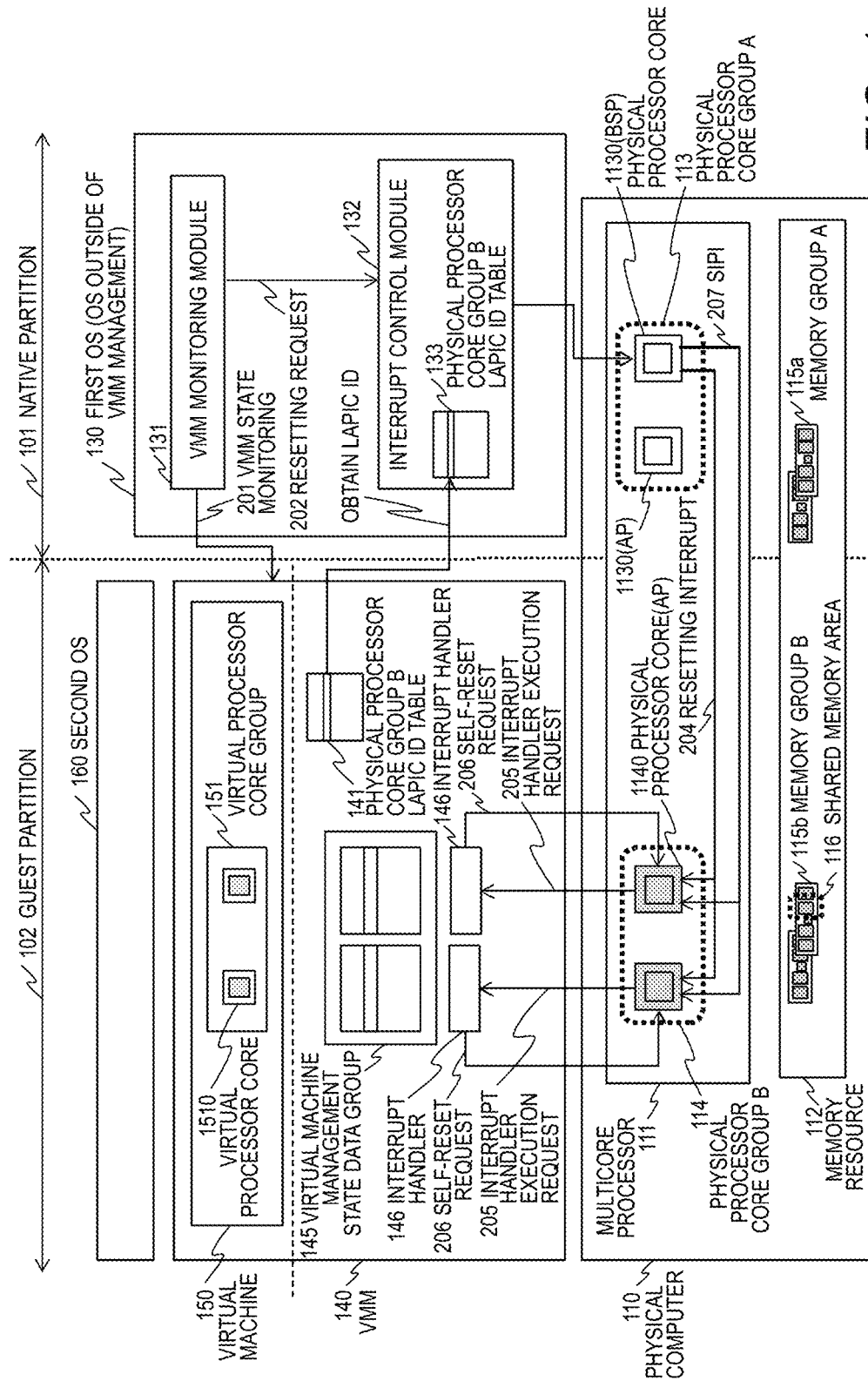
FIG. 1 is a block diagram illustrating an example of a computer system that uses a multicore processor according to an embodiment of this invention.

FIG. 1 is a block diagram illustrating an example of a computer system that uses a multicore processor according to an embodiment of this invention.

This embodiment deals with an example in which, in order to configure a unified storage apparatus, a block server OS 130 as an OS that is not managed by virtualization software (VMM) and a file server OS 160 as a guest OS on the virtualization software are run on the same hardware independently of each other, and the block server OS processes a storage control command issued from the second OS and then utilizes interrupt to notify the second OS of the completion of the command. In the following description, the block server OS is the first OS 130 and the file server OS is the second OS 160.

<Hardware Configuration>

A description is given with reference to FIG. 1 on an example of the hardware configuration of a unified storage apparatus in which this invention is carried out. A physical computer 110 includes as hardware resources a multicore processor 111 and a memory resource 112. Though not illustrated, the physical computer 110 may include an I/O resource for transmitting and receiving data to and from storage, a network, and the like.

The multicore processor 111 includes a plurality of processor cores in the form of a multicore processor. The processor cores have the function of hardware-assisted virtualization, and are classified into a physical processor core group B 114, a group of cores in which hardware-assisted virtualization is enabled, and a physical processor core group A 113, a group of cores in which hardware-assisted virtualization is disabled. The hardware-assisted virtualization in the example given here is VT-x of Intel Corporation.

In the multicore processor 111, a state in which hardware-assisted virtualization is enabled is referred to as "VMX ON", and a state in which hardware-assisted virtualization is disabled is referred to as "VMX OFF". Physical processor cores with VMX ON are referred to as physical processor cores 1140, which construct the physical processor core group B 114, and physical processor cores with VMX OFF are referred to as physical processor cores 1130, which construct the physical processor core group A 113.

The memory resource 112 is formed of a memory group A 115a allocated to the first OS and a memory group B 115b allocated to a virtual machine monitor (VMM) 140 serving as the virtualization software. The memory group A 115a is accessed by the physical processor core group A 113. The memory group B 115b is accessed by the physical processor core group B 114, and a part of the memory group B 115b is further used by the second OS 160. Further, a part of the memory area allocated to the VMM 140 within the memory group B 115b includes a shared memory area 116 that can be accessed directly by the first OS.

<Software Configuration>

Next, a main portion of a configuration of software executed on the physical computer 110 is described in detail with reference to FIG. 1.

On the single physical computer 110, the first OS and the VMM 140 serving as the virtualization software independently operate as system software. It should be noted that the first OS is an OS for accessing an HDD or the like on a sector basis through the SAN or the like. Further, the second OS (the file server OS) 160 is an OS coupled to a LAN (not shown), for managing data on a file basis.

The first OS 130 operates in a native partition 101 that can directly control the hardware of the physical computer 110, and the second OS 160 operates on a virtual machine 150 of a guest partition 102 managed by the VMM 140.

The configuration of the native partition 101 is described first.

The first OS 130 is executed in the physical processor core group A 113 of the native partition 101 where VMX is off. The first OS 130 includes a VMM monitoring module 131 for monitoring the operation state of the VMM 140, and an interrupt control module 132 for interrupting the physical processor core group B 114 to reset the relevant physical processor core in the case where a failure occurs in the VMM 140. Publicly known technologies can be used for a command processing module (not shown) for executing a storage control command, and other components, and therefore detailed descriptions are omitted herein.

The VMM monitoring module 130 monitors the operation state of the VMM 140 (201) and, in the event of a failure, transmits a resetting request 202 to the interrupt control module 132. The VMM monitoring module 130 can use a publicly known method such as the detection of heartbeats of the VMM 140 to monitor the operation state of the VMM 140.

When (or immediately after) the VMM 140 is booted, the interrupt control module 132 obtains local advanced programmable interrupt controller (LAPIC) IDs as the identifiers of the physical processor cores 1140 of the physical processor core group B in which VMX is on and which are used by the VMM 140, and keeps the obtained IDs in a physical processor core group B LAPIC ID table 133.

The interrupt control module 132 receives the resetting request 202 from the VMM monitoring module 131 and then refers to the physical processor core group B LAPIC ID table 133 to identify the physical processor core 1140 that executes the VMM 140. The interrupt control module 132 issues non-maskable interrupt (NMI) to the identified physical processor core 1140. At this point, the VMM or the second OS is being executed in the physical processor core 1140.

The physical processor core group B 114 that executes the second OS 160 receives the NMI, and then each physical processor core 1140 activates an interrupt handler as described later.

After a given period of time elapses, the interrupt control module 132 issues a startup inter processor interrupt (SIPI) to the identified physical processor core 1140 as startup interrupt. In the case where the VMM 140 is being executed in the physical processor core 1140 that has received the NMI, the physical processor core 1140 executes self-reset registered in the interrupt handler. In the case where the second OS is being executed in the physical processor core 1140 that has received the NMI, on the other hand, the physical processor core 1140 hands over control to the VMM 140 and executes self-reset and, thereafter, the physical processor core 1140 alone is rebooted by the SIPI and the VMM 140 is rebooted.

The physical processor core group A 113 that executes the first OS includes a bootstrap processor (BSP) core, which is the only physical processor core having a boot management function for booting the multicore processor 111, and controls the booting of the unified storage apparatus. The rest of the physical processor cores 1130 and 1140 function as application processors (hereinafter abbreviated as APs) that are booted when an initialization command (initialize IPI (INIT IPI)) is received from the BSP. The BSP is shown as the processor core 1130 (BSP) of the physical processor core group A 113 in FIG. 1, and the rest are shown as the physical processor cores 1130 (AP) and 1140 (AP).

The VMM monitoring module 131 and the interrupt control module 132 are loaded as programs onto the memory group A 115a to be executed by the processor cores 1130 of the physical processor core group A 113. The processor core 1130 (BSP) is the same as the processor core 1130 (AP) except that the processor core 1130 (BSP) issues IPI, and therefore is referred to as one of the physical processor cores 1130 without discrimination in a description about the execution of the programs.

Each processor core 1130 operates as a function module for providing a given function, by processing as programmed by a program of the function module. For instance, each processor core 1130 functions as the VMM monitoring module 131 by processing as programmed by the VMM monitoring program. The same applies to other programs. The processor cores 1130 also operate as function modules for providing the functions of a plurality of processing procedures executed by the respective programs. A computer and a computer system are an apparatus and a system that include those function modules.

Programs that implement the functions of the first OS, tables, and other types of information can be stored in a storage device (not shown) such as a storage subsystem, a non-volatile semiconductor memory, a hard disk drive, or a solid state drive (SSD), or in a computer-readable non-transitory data storage medium such as an IC card, an SD card, or a DVD.

The software configuration of the guest partition 102 is described next.

In the guest partition 102, the physical processor core group B 114 where VMX is on executes the VMM 140, and the virtual machine 150 on the VMM 140 executes the second OS 160.

The VMM 140 allocates physical resources of the guest partition 102 to the virtual machine 150 to run the second OS 160 as a guest OS. The VMM 140 can generate a plurality of virtual machines 150, all of which belong to the guest partition 102. The VMM 140 manages the association relation between physical resources and virtual resources of the virtual machine 150.

The VMM 140 allocates at least one physical processor core 1140 of the physical processor core group B 114 to a virtual processor core group 151 of the virtual machine 150. The virtual processor core group 151 includes at least one virtual processor core 1510, and executes the second OS 160. Physical resources of the guest partition 102 may be activated by the first OS 130 of the native partition 101, and the first OS 130 may allocate given physical resources out of the activated physical resources to the guest partition 102.

The execution state of each virtual processor core 1510 that the virtual machine 150 has is kept in a virtual machine management state data group 145, which is managed by the VMM 140. The virtual machine management state data group 145 has a data structure such as the virtual machine control structure (VMCS) disclosed in JP 2010-108271 A.

The physical processor cores 1140 of the physical processor core group B 114 where VMX is on shift between two modes: a VMX non-root mode in which the second OS 160 as a guest OS is executed and a VMX root mode in which the VMM 140 is executed as in JP 2010-108271 A. For instance, when receiving a VM entry command, the physical processor cores 1140 of the physical processor core group B 114 shift from the VMX root mode to the VMX non-root mode, read the virtual machine management state data group 145, and execute the second OS 160 of the virtual machine 150. When receiving a VM exit command, the physical processor cores 1140 shift from the VMX non-root mode to the VMX root mode, save the state of the second OS 160 in the virtual machine management state data group 145, and execute the VMM 140.

The mode in which the VMM 140 is executed and the mode in which the second OS 160 is executed are not limited to the VMX root mode and VMX non-root mode described above, and vary depending on the architecture of the multicore processor 111 or the like.

The VMM 140 keeps, in addition to the virtual machine management state data group 145, a physical processor core group B LAPIC ID table 141 in which LAPIC IDs are kept in order to identify the physical processor cores 1140 of the physical processor core group B 114, and interrupt handlers 146 that are called up when the physical processor cores 1140 receive NMI.

The VMM 140 generates the physical processor core group B LAPIC ID table 141 when booted, and transfers the table 141 to the first OS 130. The transferred table 141 is kept on the first OS 130 as a physical processor core group B LAPIC ID table 133. By transferring the physical processor core group B LAPIC ID table 141 to the first OS 130 when the VMM 140 is booted, in the event of a failure in the VMM 140, the first OS 130 can correctly identify the physical processor core 1140 to be reset from information obtained while the VMM 140 is normal.

Figure 2:
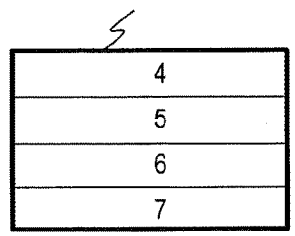
FIG. 2 shows an example of the physical processor core group B LAPIC ID tables according to the embodiment of this invention.

FIG. 2 shows an example of the physical processor core group B LAPIC ID tables 133 and 141.

The physical processor core group B LAPIC ID tables 133 and 141 contain the same information. In the illustrated example, the physical processor cores 1140 having LAPIC IDs "4" to "7" are allocated to the VMM 140 (the physical processor core group B 114 of the guest partition 102).

Figure 3:
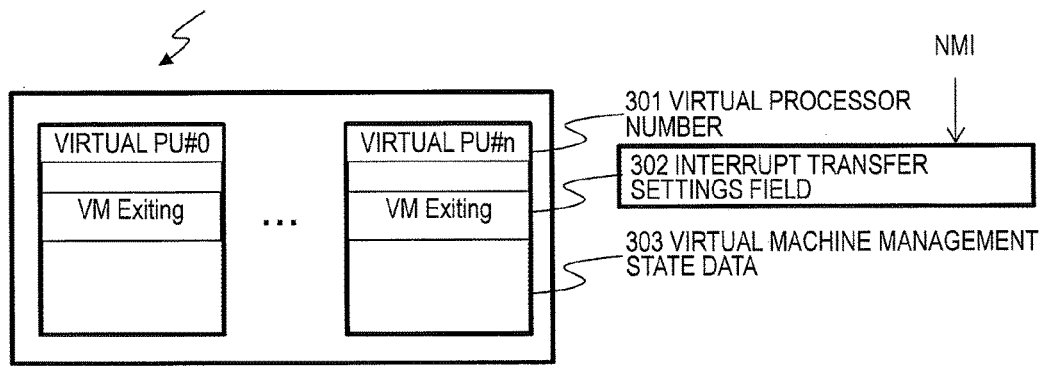
FIG. 3 is a diagram illustrating an example of the virtual machine management state data group which is kept by the VMM according to the embodiment of this invention.

FIG. 3 is a diagram illustrating an example of the virtual machine management state data group 145 which is kept by the VMM 140. The virtual machine management state data group 145 includes a virtual processor number 301, which indicates the identifier of a virtual processor core (denoted by PU in FIG. 3), an interrupt transfer settings field 302 for setting what operation is to be executed when NMI is received, and virtual machine management state data 303 in which the state of the guest OS is kept.

In the illustrated example, "VM Exiting" which indicates a shift to the VMX root mode is set in the interrupt transfer settings field 302 for each of virtual processor cores "#0" to "#n" when the NMI is received. The status of each virtual processor core 1510, the association relation between the physical processor cores 1130 and 1140 and the virtual processor cores 1510, and the like are kept as the virtual machine management state data 303 as in the VMCS of JP 2010-108271 A.

<Outline of Processing>

Processing in this embodiment is outlined below. The premise of this embodiment is that hardware-assisted virtualization of the multicore processor 111 can be set to be enabled/disabled on a core-by-core basis, and that the physical processor core 1140 in which hardware-assisted virtualization is enabled does not receive (disables) a resetting command (INIT IPI), but receives NMI. As the multicore processor 111 of this type, x86-series processors which support the VT-x of Intel Corporation are known.

In the unified storage apparatus of this embodiment, one multicore processor 111 has a plurality of physical processor cores 1130 and 1140, and the physical processor core group A 113 which includes the BSP boots the first OS 130 in the native partition 101 where VMX is off. The first OS 130 sets the physical processor core group B 114 of the guest partition 102 to VMX ON and boots the VMM 140.

The VMM 140, after booted, transfers the physical processor core group B LAPIC ID table 141 to the first OS 130. The first OS 130 keeps LAPIC IDs obtained by the VMM 140 immediately after booting in the physical processor core group B LAPIC ID table 133 of the interrupt control module 132.

The transfer of the physical processor core group B LAPIC ID table 141 is executed via the shared memory area 116 of the memory group B 115*b*. Specifically, the VMM 140 stores the LAPIC ID table 141 of the physical processor core group B 114 in the shared memory area 116. The VMM 140 then notifies the memory address of the shared memory area 116 to the first OS 130. Receiving the notification, the first OS 130 obtains the physical processor core group B LAPIC ID table 141 from the received memory address, and stores the obtained data in the physical processor core group B LAPIC ID table 133 of the interrupt control module 132.

The VMM 140 next generates the virtual machine 150 and boots the second OS 160. At this point, the VMM 140 sets the interrupt handlers 146 respectively for the physical processor cores 1140 that are allocated to the virtual machine 150, and keeps the settings in a given area of the memory group 115*b*.

The VMM 140 also sets "VM Exiting" in the interrupt transfer settings field 302 of the virtual machine management state data group 145 in preparation for a shift to the VMX root mode in which the VMM 140 is executed by interrupting the execution of the second OS 160 when NMI is received.

When the second OS 160 is booted, the VMM monitoring module 131 of the first OS 130 starts monitoring the VMM 140 (201). The VMM monitoring module 131 detects an abnormality in the VMM 140 and transmits a resetting request to the interrupt control module 132 (202).

The interrupt control module 132 refers to the physical processor core group B LAPIC ID table 133 to identify, with the use of the LAPIC IDs obtained at the time of booting of the VMM 140, the physical processor core group B 114 and the physical processor cores 1140 that are to be reset. The interrupt control module 132 transmits NMI as a resetting interrupt to each identified physical processor core 1140 from the physical processor core 1130 (BSP) (204).

Receiving the NMI, the physical processor cores 1140 in the physical processor core group B 114 that execute the second OS 160 shift from the VMX non-root mode to the VMX root mode, based on "VM Exiting" set in the interrupt transfer settings field 302 of the virtual machine management state data group 145.

The physical processor cores 1140 that are in the VMX root mode request the execution of the interrupt handlers 146 (205) when receiving NMI. As described later, the interrupt handlers 146 execute, for each of the physical processor cores 1140 in the physical processor core group B 114, a procedure that involves switching to VMX OFF, executing self-reset (206), receiving SIPI from the first OS 130 (207), switching to VMX ON, and rebooting the VMM 140.

Through the processing described above, the VMM 140 in which a failure has occurred can be rebooted by resetting the physical processor core group B 114 of the guest partition 102, while keeping the first OS 130 running in the physical processor core group A 113 in the native partition 101.

<Details of Processing>

Figure 4:
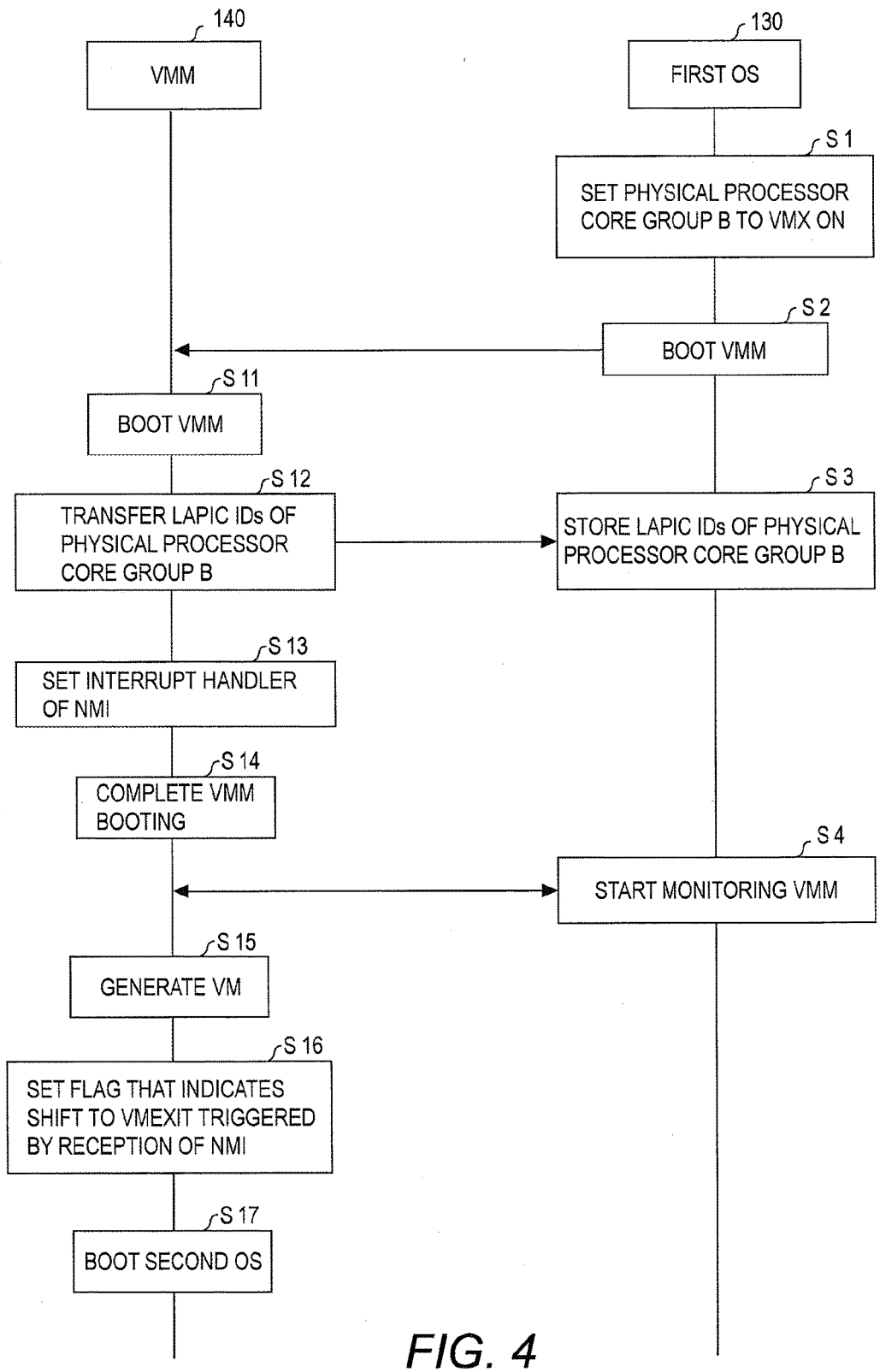
FIG. 4 is a sequence diagram illustrating an example of processing in which the first OS boots the VMM according to the embodiment of this invention.

FIG. 4 is a sequence diagram illustrating an example of processing in which the first OS 130 boots the VMM 140.

The first OS 130 first sets the physical processor core group B 114 of the guest partition 102 to VMX ON (S1). The first OS 130 next loads the VMM 140 onto the memory group B 115*b*, allocates the physical processor core group B 114 to the VMM 140, and boots the VMM 140 (S2 and S11).

When booted, the VMM 140 executes initialization. The VMM 140 first sets the shared memory area 116 in the memory group B 115*b* to secure a memory area in which the first OS 130 can read and write.

The VMM 140 next obtains LAPIC IDs of the physical processor core group B 114 allocated to the VMM 140, and stores the obtained LAPIC IDs in the physical processor core group B LAPIC ID table 141. The VMM 140 then transfers the physical processor core group B LAPIC ID table 141 to the first OS 130 (S12).

The transfer is executed via the shared memory area 116 as described above. The VMM 140 stores the LAPIC ID table 141 of the physical processor core group B 114 in the shared memory area 116. The VMM 140 notifies the memory address of the shared memory area 116 to the first OS 130. The first OS 130 receives the notification, obtains the physical processor core group B LAPIC ID table 141 from the received memory address, and stores the obtained data in the physical processor core group B LAPIC ID table 133 of the interrupt control module 132 (S3). The physical processor core group B LAPIC ID table 133 is kept in the memory group A 115*a*.

The VMM 140 sets the interrupt handlers 146 respectively for the physical processor cores 1140 of the physical processor core group B 114 (S13). When this initialization is finished, the booting of the VMM 140 is complete (S14).

The VMM 140 next generates a given virtual machine (VM) 150 in order to run the second OS 160 (S15). The VMM 140 generates the virtual machine 150 by allocating a part of the memory group B 115*b* to a virtual memory (not shown), and allocating some of the physical processor cores 1140 of the physical processor core group B 114 to the virtual processor core group 151.

The VMM 140 sets, for each of the virtual processor cores 1510 allocated to the virtual machine 150, the virtual machine management state data 303 and the interrupt transfer settings field 302 which are illustrated in FIG. 3. As described above, "VM Exiting" is set in the interrupt transfer settings field 302 as a flag that indicates a shift to the VMX root mode by VM EXIT in response to the reception of NMI (S16). In other words, when the virtual processor cores 1510 which execute the second OS 160 receive NMI, the virtual processor cores 1510 stop the notification of the NMI to the second OS 160, and shift to the VMX root mode to process the NMI in the VMM 140.

The VMM 140 loads the second OS 160 to the virtual memory of the generated virtual machine 150, and boots the second OS 160 in the virtual processor core group 151 (S17).

Meanwhile, the first OS 130 activates the VMM monitoring module 131 and starts monitoring the VMM 140 after a given period of time elapses since the reception of the physical processor core group B LAPIC ID table 141 (S4). While the VMM monitoring module 131 is activated at the time the booting of the VMM 140 is completed in the illustrated example, this invention is not limited thereto and the monitoring by the VMM monitoring module 131 may be started after a given period of time elapses since, for example, the booting of the second OS 160.

Figure 5:
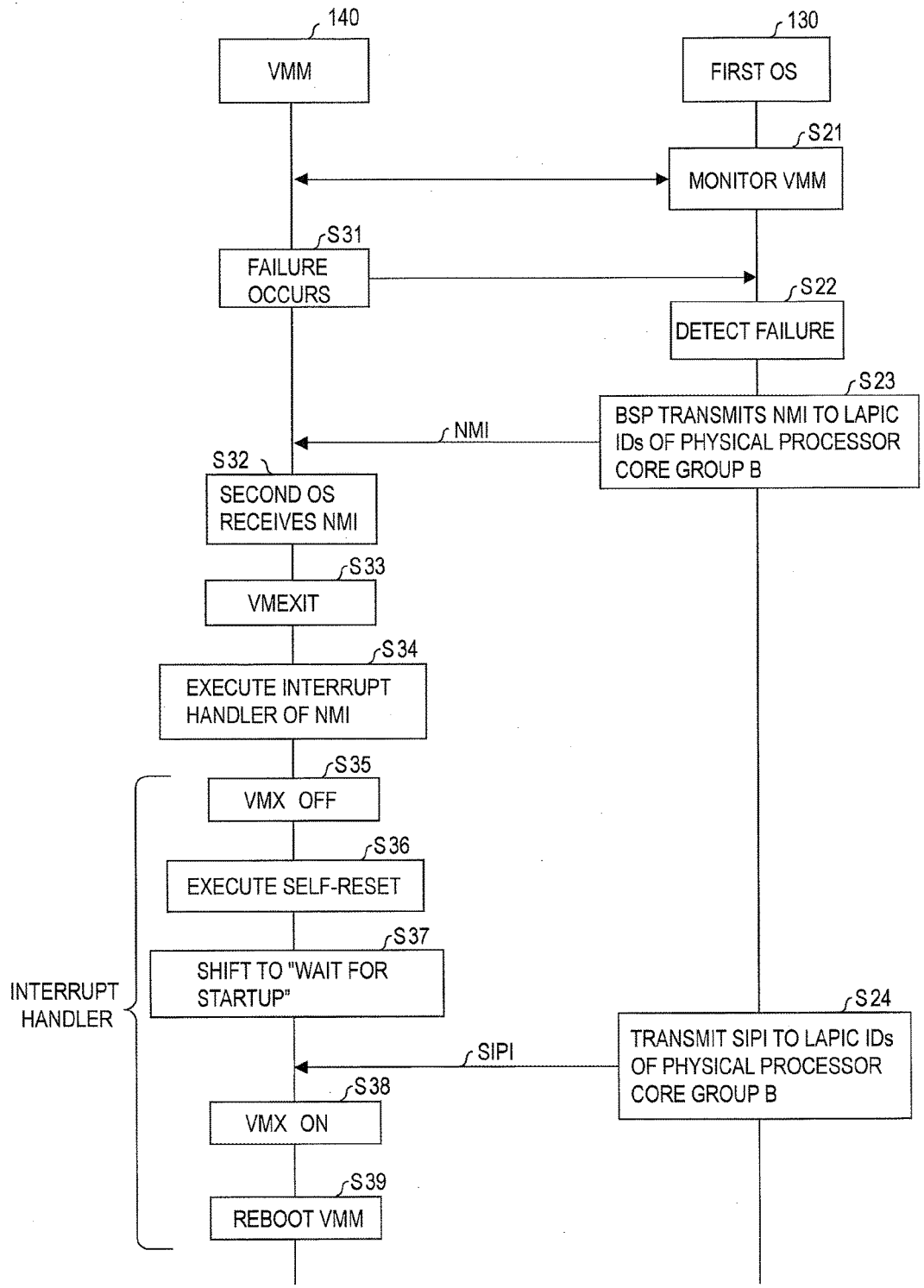
FIG. 5 is a sequence diagram illustrating an example of processing that is executed in the unified storage apparatus when a failure occurs in the VMM according to the embodiment of this invention.

FIG. 5 is a sequence diagram illustrating an example of processing that is executed in the unified storage apparatus when a failure occurs in the VMM 140. The VMM monitoring module 131 of the first OS 130 monitors the VMM 140 and determines whether or not a failure has occurred (S21). When a failure occurs in the VMM 140 (S31), the VMM monitoring module 131 detects the failure (S22). The VMM monitoring module 131 determines to reboot the VMM 140 based on the detection of the failure.

In the first OS 130, the VMM monitoring module 131 notifies a resetting request (202) to the interrupt control module 132. The interrupt control module 132 refers to the physical processor core group B LAPIC ID table 133 to identify the physical processor cores 1140 to which resetting interrupt is to be notified in the manner described above. The physical processor core group B LAPIC ID table 133 is obtained from the VMM 140 immediately after booting, and the physical processor cores 1140 to be reset can therefore be identified correctly despite a failure.

The interrupt control module 132 transmits NMI as resetting interrupt to each physical processor core 1140 identified above from the physical processor core 1130 (BSP) (S23).

Each physical processor core 1140 in the physical processor core group B 114 receives the NMI (S32). Receiving the NMI, the physical processor cores 1140 that execute the second OS 160 among the physical processor core group B 114 shift from the VMX non-root mode to the VMX root mode based on "VM Exiting" set in the interrupt transfer settings field 302 of the virtual machine management state data group 145 (S33).

The physical processor cores 1140 that have shifted to the VMX root mode next execute the interrupt handlers 146 in response to the reception of the NMI (S34).

The interrupt handlers 146 are respectively executed by the physical processor cores 1140 of the physical processor core group B 114. Each physical processor core 1140 first issues a command for switching to VMX OFF in order to change its own state to one where hardware-assisted virtualization is disabled (S35).

The physical processor core 1140 next executes self-reset by issuing INIT IPI to itself as processor core initializing interrupt. (S36)

As a result of the self-reset, the physical processor core 1140 shifts to a boot standby state (Wait for Startup) (S37).

After a given period of time elapses since the transmission of the NMI to the second OS 160, the first OS 130 issues a startup interrupt (startup IPI) to each physical processor core 1140 in the physical processor core group B 114 (S24). The given period of time is a time required for the physical processor core group B 114 to finish Steps S32 to S37, which is set in advance.

Receiving the startup IPI, each physical processor core 1140 in the physical processor core group B 114 issues a command for shifting to VMX ON in order to switch to a state where hardware-assisted virtualization is enabled (S38), and then loads the VMM 140 onto the memory group 115b and reboots the VMM 140 (S39).

Through the processing described above, the first OS 130 detects a failure in the VMM 140, notifies NMI to the physical processor core group B 114, and uses the interrupt handlers 146 to reset the physical processor core group B 114. The physical processor core group A 113 can meanwhile keep the first OS 130 running in the native partition 101.

The first OS 130 in the native partition 101 reboots the VMM 140 by notifying startup IPI after a given period of time elapses since the notification of the NMI to the physical processor core group B 114 of the guest partition 102.

In this manner, a single hardware resource is divided into the native partition 101 and the guest partition 102, and the VMM 140 can be rebooted by resetting only the physical processor core group B 114 of the guest partition 102 in which a failure has occurred while keeping the first OS 130 running in the native partition 101.

The LAPIC ID table 141 of the physical processor core group B 114 in the guest partition 102 that is obtained while the VMM 140 is booted is copied to the first OS 130 of the native partition 101 in advance, and the physical processor core 1140 to be reset is thus identified from information obtained at the time of booting.

Information of the physical processor core 1140 in the guest partition 102 that is obtained from the VMM 140 after a failure occurs is not guaranteed to be correct. This invention ensures that the interrupt control module 132 correctly identifies the physical processor cores 1140 to be reset by obtaining the identifiers (LAPIC IDs) of the physical processor cores 1140 that execute the VMM 140 in the guest partition 102 while (or immediately after) the VMM 140 is booted, and copying the obtained identifiers to the first OS 130 as normal values to keep.

This invention uses the interrupt handlers 146 to reset the physical processor cores 1140 that execute the VMM 140 where a failure has occurred by transmitting NMI to the physical processor cores 1140. This ensures that only the physical processor core group B 114 of the guest partition 102 is reset even when the employed physical processor cores 1140 cannot receive (disable) a reset command (INIT IPI) if VMX is on (if hardware-assisted virtualization is enabled).

The interrupt handlers 146 that are executed by the physical processor cores 1140 in response to the reception of NMI execute self-reset after disabling hardware-assisted virtualization (VMX OFF). This way, even the physical processor cores 1140 that reject a reset when hardware-assisted virtualization is enabled (VMX ON) can be reset.

A command to execute a shift to the VMX root mode in response to the reception of NMI (VM Exit) is set in advance in the interrupt transfer settings field 302 of the virtual machine management state data group 145 for keeping the execution state of the virtual processor cores 1510 of the virtual machine 150. This enables the physical processor cores 1140 to shift to the VMX root mode in response to the reception of NMI and execute the interrupt handlers 146 even when the virtual machine 150 is executing the second OS (guest OS) 160.

The multicore processor 111 of the embodiment described above may have a homogeneous configuration or a heterogeneous configuration.

While the embodiment described above gives an example of applying this invention to a unified storage apparatus, the same effects as those described above can be obtained also when this invention is applied to a computer.

While the embodiment described above gives an example of resetting the physical processor core group B 114 that executes the VMM 140 when a failure is detected in the VMM 140, this invention is not limited thereto. For instance, the first OS 130 may determine whether or not the VMM 140 needs to be rebooted based on given conditions, and, when it is determined that the reboot is necessary, the first OS 130 may reset the physical processor core group B 114.

While the embodiment described above gives an example in which the VMM 140 transfers the physical processor core group B LAPIC ID table 141 via the shared memory area 116, this invention is not limited thereto. For instance, the VMM 140 may transfer the physical processor core group B LAPIC ID table 141 to the first OS 130 over a network (not shown) after the booting of the VMM 140 is completed.

Further, a part or all of the components, processing functions, processing means, and the like of the computer and the like, which are described above in the embodiment of this invention, may be realized by dedicated hardware.

Further, various kinds of software exemplified above in this embodiment can be stored in electromagnetic, electronic, optical, and other various recording media (for example, non-transitory storage medium), and can be downloaded onto the computer through a communication network such as the Internet.

Further, this invention is not limited to the above-mentioned embodiment, and various modification examples are included. For example, the above-mentioned embodiment is described in detail for the sake of comprehensive description of this invention, and this invention is not necessarily limited to one that includes all the components that have been described.

What is claimed is:
1. A method of controlling a computer,
the computer comprising:
a multicore processor having a function of hardware-assisted virtualization;
a memory;
a first processor core group of processor cores of the multicore processor where the hardware-assisted virtualization is disabled;
a second processor core group of processor cores of the multicore processor where the hardware-assisted virtualization is enabled;
a first memory group comprising a partial area of the memory; and
a second memory group comprising a remaining area of the memory,
the method comprising:

a first step of allocating the first processor core group and the first memory group to a first OS, and booting the first OS;
a second step of allocating the second processor core group and the second memory group to a virtualization module, which runs a virtual machine, and booting the virtualization module;
a third step of allocating, by the virtualization module, a given area of the memory and given processor cores of the second processor core group to the virtual machine, and booting a second OS;
a fourth step of registering, by the virtualization module, interrupt handlers for resetting the second processor core group;
a fifth step of obtaining and keeping, by the first OS, identifiers of the processor cores that belong to the second processor core group when the virtualization module is booted;
a sixth step of monitoring, by the first OS, an operation state of the virtualization module and determining whether or not the virtualization module is to be rebooted, based on given conditions;
a seventh step of issuing, by the first OS, when the virtualization module is to be rebooted, resetting interrupt to the processor cores belonging to the second processor core group that are associated with the kept identifiers;
an eighth step of receiving, by the second processor core group that is allocated to the virtualization module, the resetting interrupt and executing the interrupt handlers to reset the processor cores of the second processor core group; and
a ninth step of issuing, by the first OS, startup interrupt to the second processor core group.

2. The method of controlling a computer according to claim 1,
wherein the fourth step comprises registering, by the virtualization module, self-reset processing of the processor cores of the second processor core group in interrupt handlers that are associated with the respective processor cores of the second processor core group, as the interrupt handlers for resetting the second processor core group, and
wherein the eighth step comprises receiving, by the second processor core group, the resetting interrupt, and calling up the registered interrupt handlers to execute the self-reset processing for each of the processor cores of the second processor core group independently of one another.

3. The method of controlling a computer according to claim 1,
wherein the sixth step comprises:
monitoring, by the first OS, the operation state of the virtualization module, and determining whether or not an abnormality has occurred; and
determining, by the first OS, to reboot the virtualization module when it is determined that an abnormality has occurred.

4. The method of controlling a computer according to claim 1, wherein the seventh step comprises issuing non-maskable interrupt (NMI) as the resetting interrupt.

5. The method of controlling a computer according to claim 2, wherein, in the self-reset processing, the interrupt handlers issue processor core initializing interrupt to the processor cores of the second processor core group.

6. The method of controlling a computer according to claim 2, wherein the ninth step comprises issuing, after a given period of time elapses since the resetting interrupt is issued in the seventh step to the processor cores belonging to the second processor core group, by an interrupt control module, Startup Inter Processor Interrupt (SIPI) to the second processor core group.

7. The method of controlling a computer according to claim 4,
wherein the third step comprises setting so that, when the NMI is received in a state where the second OS is run on the virtual machine, processing of the NMI is shifted to the virtualization module instead of transferring the NMI to the virtual machine,
wherein the fourth step comprises registering, by the virtualization module, in the interrupt handlers of the respective processor cores in the second processor core group, a command to disable the hardware-assisted virtualization and a command to issue processor core initializing interrupt to the processor cores of the second processor core group, and
wherein in addition to issuing, to the virtualization module, by the first OS, the startup interrupt to the second processor core group, the ninth step comprises:
receiving, by the second processor core group, the startup interrupt and issuing a command to enable the hardware-assisted virtualization to the processor cores of the second processor core group; and
rebooting the virtualization module by the second processor core group.

8. A computer, comprising:
a multicore processor having a function of hardware-assisted virtualization;
a memory;
a first processor core group of processor cores of the multicore processor where the hardware-assisted virtualization is disabled;
a second processor core group of processor cores of the multicore processor where the hardware-assisted virtualization is enabled;
a first memory group comprising a partial area of the memory;
a second memory group comprising a remaining area of the memory;
a first OS to which the first processor core group and the first memory group are allocated; and
a virtualization module to which the second processor core group and the second memory group are allocated, for running a virtual machine,
wherein the virtualization module registers interrupt handler processing for resetting the second processor core group, allocates a given area of the memory and given processor cores of the second processor core group to the virtual machine, and boots a second OS,
wherein the first OS comprises:
a monitoring module for monitoring an operation state of the virtualization module to determine, based on given conditions, whether or not to reboot the virtualization module; and
an interrupt control module for obtaining and keeping identifiers of the respective processor cores that belong to the second processor core group at a time of booting of the virtualization module, and, when the monitoring module determines to reboot the virtualization module, issuing resetting interrupt to the processor cores belonging to the second processor core group that are associated with the kept identifiers,
wherein the second processor core group that is allocated to the virtualization module receives the resetting interrupt and executes the interrupt handler processing to reset its own processor cores, and
wherein the interrupt control module issues startup interrupt to the second processor core group.

9. The computer according to claim 8,
wherein the virtualization module registers self-reset processing of the processor cores of the second processor core group in interrupt handlers that are associated with the respective processor cores of the second processor core group, as the interrupt handlers for resetting the second processor core group, and
wherein the second processor core group receives the resetting interrupt, and calls up the registered interrupt handlers to execute the self-reset processing for each of the processor cores of the second processor core group independently of one another.

10. The computer according to claim 8, wherein the monitoring module monitors the operation state of the virtualization module to determine whether or not an abnormality has occurred, and determines to reboot the virtualization module when it is determined that an abnormality has occurred.

11. The computer according to claim 8, wherein the interrupt control module issues non-maskable interrupt (NMI) as the resetting interrupt.

12. The computer according to claim 9, wherein, in the self-reset processing, the interrupt handlers issue processor core initializing interrupt to the processor cores of the second processor core group.

13. The computer according to claim 9, wherein, after a given period of time elapses since the resetting interrupt is issued to the processor cores belonging to the second processor core group, the interrupt control module issues Startup Inter Processor Interrupt (SIPI) to the second processor core group.

14. The computer according to claim 11,
wherein the virtual machine executes setting so that, when the NMI is received in a state where the second OS is run, processing of the NMI is shifted to the virtualization module instead of transferring the NMI to the virtual machine,
wherein the virtualization module registers, in the interrupt handlers of the respective processor cores in the second processor core group, a command to disable the hardware-assisted virtualization and a command to issue processor core initializing interrupt to the processor cores of the second processor core group, and
wherein the second processor core group reboots the virtualization module after receiving the startup interrupt and issuing a command to enable the hardware-assisted virtualization to the processor cores of the second processor core group.

15. The computer according to claim 8, wherein the first processor core group comprises an only Bootstrap Processor (BSP) core that has a boot management function of the multicore processor.

* * * * *